US012118901B1

(12) United States Patent
Appiah

(10) Patent No.: US 12,118,901 B1
(45) Date of Patent: Oct. 15, 2024

(54) LUGGAGE TAG

(71) Applicant: Gameli Appiah, Atlanta, GA (US)

(72) Inventor: Gameli Appiah, Atlanta, GA (US)

( * ) Notice: Subject to any disclaimer, the term of this patent is extended or adjusted under 35 U.S.C. 154(b) by 106 days.

(21) Appl. No.: 17/880,033

(22) Filed: Aug. 3, 2022

(51) Int. Cl.
*G09F 3/02* (2006.01)
*G09F 3/04* (2006.01)

(52) U.S. Cl.
CPC .................. *G09F 3/02* (2013.01); *G09F 3/04* (2013.01); *G09F 2003/0254* (2013.01)

(58) Field of Classification Search
CPC ....... G09F 2003/0254; G09F 3/02; G09F 3/04
See application file for complete search history.

(56) References Cited

U.S. PATENT DOCUMENTS 627,920 A * 6/1899 Gould ....................... G09F 3/14 63/21
989,297 A * 4/1911 Schaefer ................... G09F 3/18 40/653
2,642,684 A * 6/1953 Watts ........................ G09F 3/04 40/669
2,768,458 A * 10/1956 Anania ..................... G09F 3/04 40/665
3,036,576 A * 5/1962 Wassell ................... B42F 19/00 D19/99
3,550,295 A * 12/1970 Anania ..................... G09F 3/04 40/668
3,757,936 A * 9/1973 Lindegren .............. B65D 83/08 292/307 R
3,837,101 A * 9/1974 Young .................... A45C 13/42 292/307 R
D246,590 S 12/1977 Sollazzi
4,142,310 A * 3/1979 Groselak ................ A45C 13/42 D20/27
4,266,354 A * 5/1981 Daenen ..................... G09F 3/18 40/665
4,630,384 A * 12/1986 Breen ....................... G09F 3/04 40/665
4,916,841 A * 4/1990 Dawson .................... G09F 3/14 40/6
4,978,144 A * 12/1990 Schmidt ................ G09F 3/0289 283/70
5,279,057 A * 1/1994 Melin ....................... G09F 3/10 40/633
5,381,617 A * 1/1995 Schwartztol .............. G09F 3/14 40/6
6,671,987 B1 1/2004 Fenton
7,523,576 B1 * 4/2009 Petty ......................... G09F 3/04 40/6
7,958,659 B1 * 6/2011 Tedesco .................... G09F 3/14 206/348

(Continued)

*Primary Examiner* — David R Dunn
*Assistant Examiner* — Christopher E Veraa

(57) ABSTRACT

The luggage tag is an identification device. The luggage tag comprises a tag panel, an anchor panel, and a luggage item. The luggage item further comprises an anchor point. The tag panel attaches to the anchor panel to form a lateral disk structure. The lateral disk structure formed by the tag panel and the anchor panel attaches to the anchor point of the luggage item. The lateral disk structure is a flexible structure. The lateral disk structure displays a tag panel image that: a) uniquely identifies the luggage item; and, b) associated the luggage item with its owner.

11 Claims, 3 Drawing Sheets

(56) References Cited

U.S. PATENT DOCUMENTS

| | | | | |
|---|---|---|---|---|
| 8,074,389 | B2 * | 12/2011 | Greer | G09F 3/005 40/633 |
| 8,336,234 | B2 | 12/2012 | Spiro | |
| 10,157,557 | B1 * | 12/2018 | Martin | G09F 23/00 |
| D921,112 | S | 6/2021 | Asano | |
| 2005/0081411 | A1 * | 4/2005 | Becker | G09F 3/20 40/6 |
| 2008/0120881 | A1 * | 5/2008 | Rhinehart | A45F 5/10 223/87 |
| 2014/0173951 | A1 * | 6/2014 | Shimizu | G09F 3/0297 40/6 |
| 2019/0088166 | A1 | 3/2019 | Seidlitz | |
| 2021/0153618 | A1 * | 5/2021 | Karan | A45C 13/42 |
| 2021/0361047 | A1 * | 11/2021 | Norden | G09F 3/14 |

* cited by examiner

LUGGAGE TAG

STATEMENT REGARDING FEDERALLY SPONSORED RESEARCH

Not Applicable

REFERENCE TO APPENDIX

Not Applicable

BACKGROUND OF THE INVENTION

Field of the Invention

11 The present invention relates to the field of labels, tag tickets, and similar identification or indication means. (G09F3/00)

SUMMARY OF INVENTION

The luggage tag is an identification device. The luggage tag comprises a tag panel, an anchor panel, and a luggage item. The luggage item further comprises an anchor point. The tag panel attaches to the anchor panel to form a lateral disk structure. The lateral disk structure formed by the tag panel and the anchor panel attaches to the anchor point of the luggage item. The lateral disk structure is a flexible structure. The lateral disk structure displays a tag panel image that: a) uniquely identifies the luggage item; and, b) associated the luggage item with its owner.

These together with additional objects, features and advantages of the luggage tag will be readily apparent to those of ordinary skill in the art upon reading the following detailed description of the presently preferred, but nonetheless illustrative, embodiments when taken in conjunction with the accompanying drawings.

In this respect, before explaining the current embodiments of the luggage tag in detail, it is to be understood that the luggage tag is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the luggage tag.

It is therefore important that the claims be regarded as including such equivalent construction insofar as they do not depart from the spirit and scope of the luggage tag. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
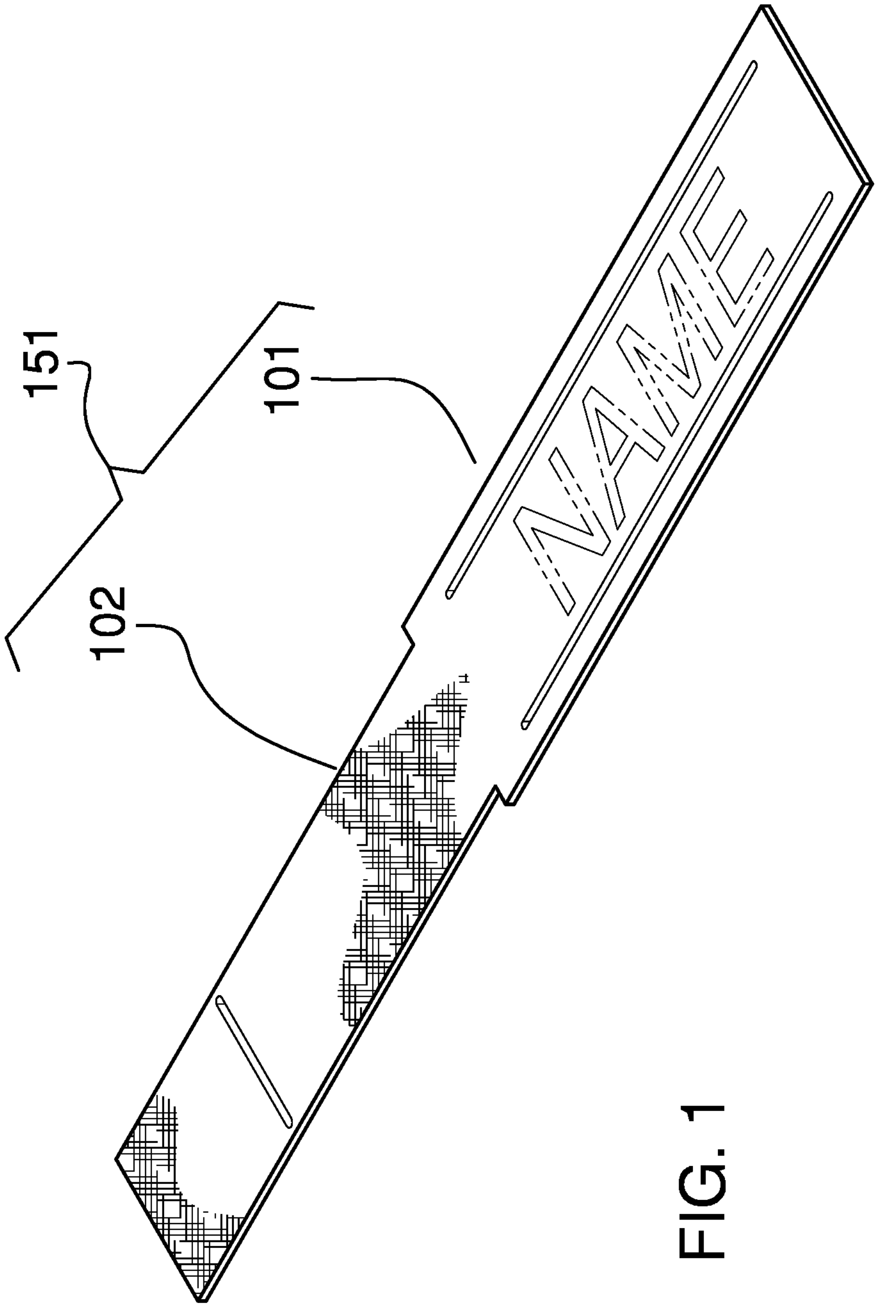
FIG. 1 is a perspective view of an embodiment of the disclosure.
Figure 2:
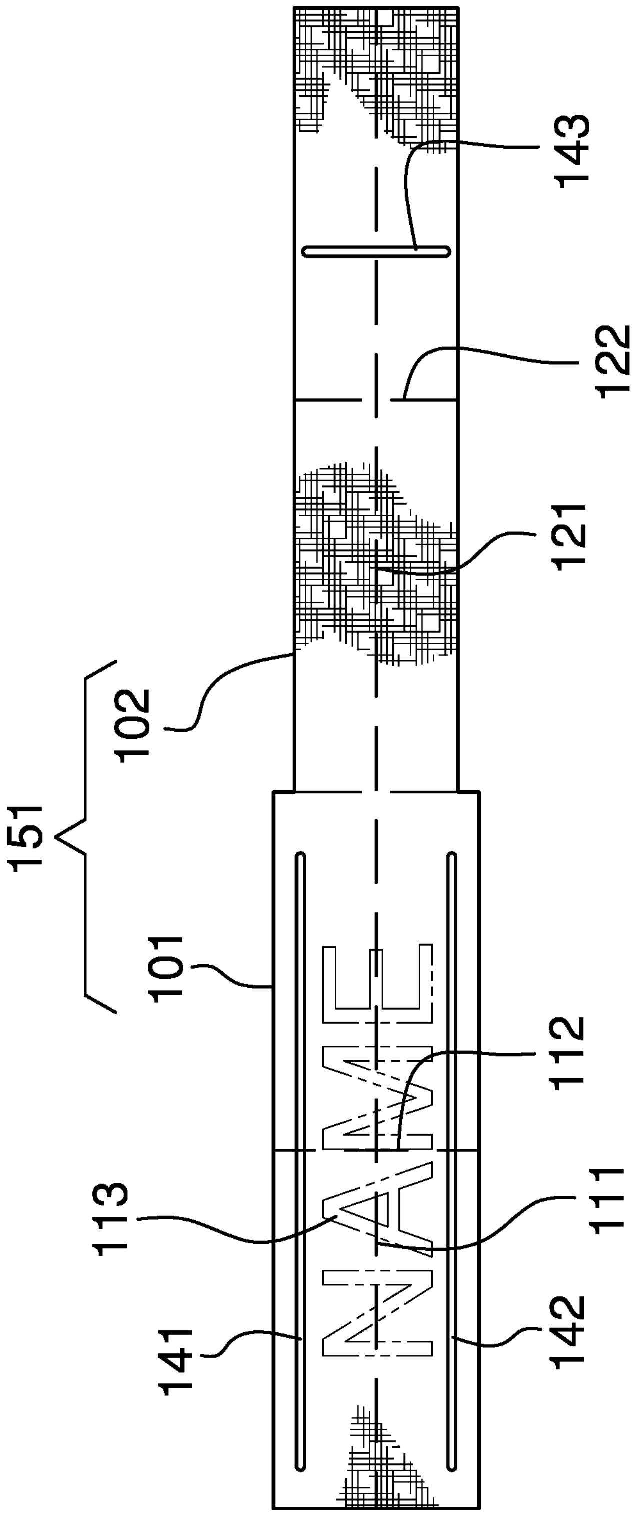
FIG. 2 is a front view of an embodiment of the disclosure.
Figure 3:
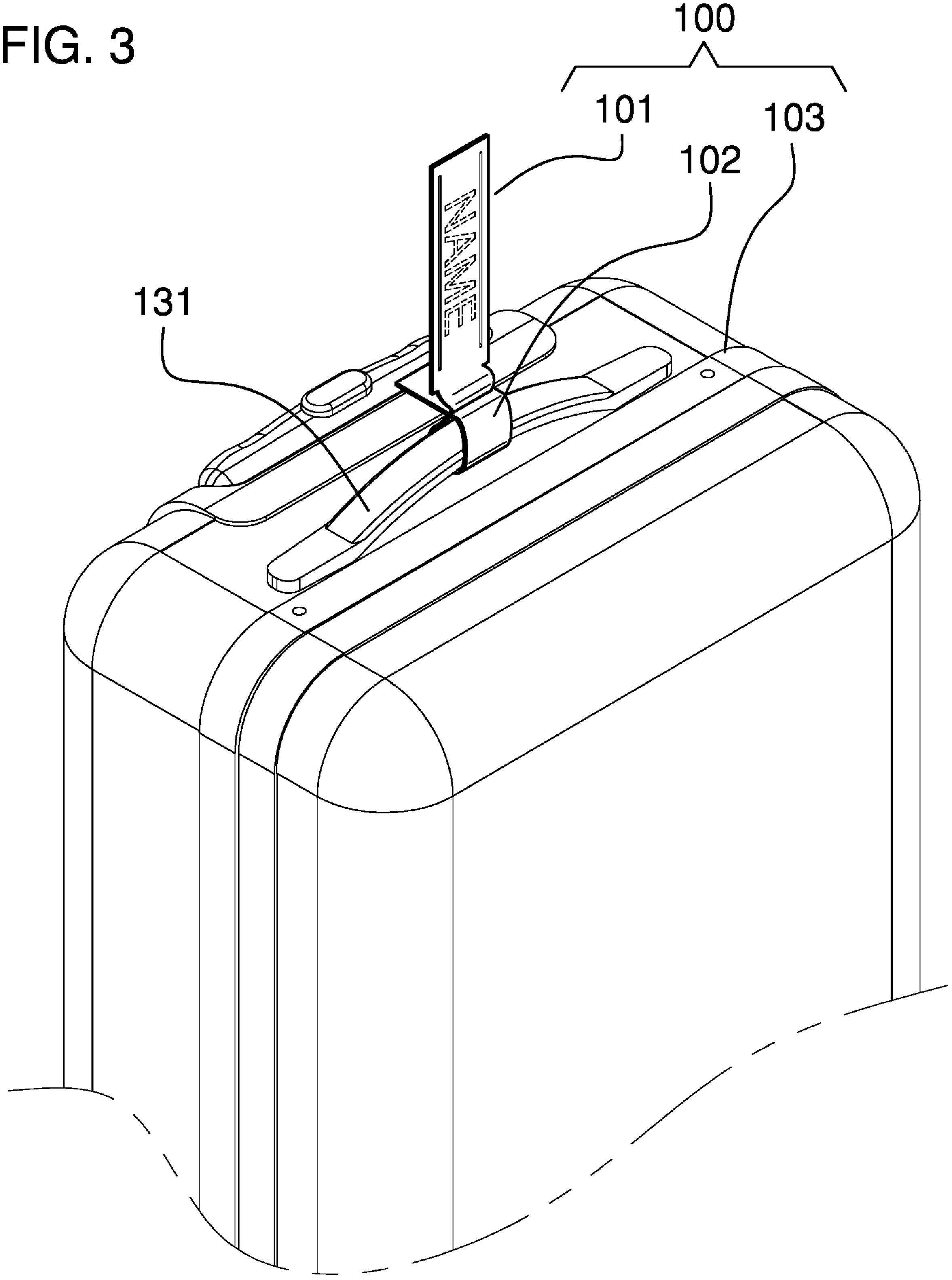
FIG. 3 is an in-use view of an embodiment of the disclosure.

Detailed reference will now be made to one or more potential embodiments of the disclosure, which are illustrated in FIGS. 1 through 3.

The luggage tag 100 (hereinafter invention) is an identification device. The invention 100 comprises a tag panel 101, an anchor panel 102, and a luggage item 103. The luggage item 103 further comprises an anchor point. The tag panel 101 attaches to the anchor panel 102 to form a lateral disk structure 151. The lateral disk structure 151 formed by the tag panel 101 and the anchor panel 102 attaches to the anchor point of the luggage item 103. The lateral disk structure 151 is a flexible structure. The lateral disk structure 151 displays a tag panel 101 image that: a) uniquely identifies the luggage item 103; and, b) associates the luggage item 103 with its owner.

The luggage item 103 is an item of luggage. The term luggage is defined elsewhere in this disclosure. The luggage item 103 further comprises an anchor point 131. The anchor point 131 forms the structure on the luggage item 103 that the lateral disk structure 151 binds to. In the first potential embodiment of the disclosure, the anchor point 131 is the handle of the luggage item 103.

The tag panel 101 is a sheeting. The tag panel 101 is a flexible structure. The tag panel 101 is formed with a rectangular disk shape. The tag panel 101 physically attaches to the anchor panel 102 to form the lateral disk structure 151. The tag panel 101 comprises the tag panel 101 major axis 111, a tag panel 101 minor axis 112, a tag panel 101 image 113, a first slit 141 and a second slit 142.

The tag panel 101 major axis 111 is the major axis of the rectangular disk structure of the tag panel 101. The major axis is defined elsewhere in this disclosure. The tag panel 101 minor axis 112 is the minor axis of the rectangular disk structure of the tag panel 101. The minor axis is defined elsewhere in this disclosure.

The tag panel 101 image 113 is an image. The tag panel 101 image 113 is displayed from the congruent end of the disk structure of the tag panel 101 with the greatest surface area. The tag panel 101 visibly displays the tag panel 101 image 113. The tag panel 101 image 113 visually identifies the association between the luggage item 103 and its owner.

The first slit 141 is a slit that is formed through the congruent ends of the disk structure of the tag panel 101. The first slit 141 is positioned in the tag panel 101 such that the first slit 141 runs parallel to the tag panel 101 major axis 111.

The second slit 142 is a slit that is formed through the congruent ends of the disk structure of the tag panel 101. The second slit 142 is positioned in the tag panel 101 such that the second slit 142 runs parallel to the tag panel 101 major axis 111. The second slit 142 is positioned relative to the first slit 141 such that the span of the length between the second slit 142 and the first slit 141 as measured parallel to the tag panel 101 minor axis 112 is less than the span of the length of the third slit 143 of the anchor panel 102. The first slit 141 and the second slit 142 form guides that facilitate the folding of the edges of the perimeter of the tag panel 101 onto the congruent ends of the disk structure of the tag panel 101.

The anchor panel 102 is a sheeting. The anchor panel 102 is a flexible structure. The anchor panel 102 is formed with a rectangular disk shape. The anchor panel 102 physically attaches to the tag panel 101 to form the lateral disk structure 151. The anchor panel 102 loops around the anchor point 131 luggage item 103. The anchor panel 102 binds the tag panel 101 to the anchor point 131. The anchor panel 102 further comprises an anchor panel 102 major axis 121, an anchor panel 102 minor axis 122, and a third slit 143.

The anchor panel 102 major axis 121 is the major axis of the rectangular disk structure of the anchor panel 102. The major axis is defined elsewhere in this disclosure. The anchor panel 102 attaches to the tag panel 101 such that the anchor panel 102 major axis 121 aligns with the tag panel 101 major axis 111 such that the anchor panel 102 major axis 121 and the tag panel 101 major axis 111 form a single straight line.

The anchor panel 102 minor axis 122 is the minor axis of the rectangular disk structure of the anchor panel 102. The span of the length of the anchor panel 102 minor axis 122 is less than the span of the length of the tag panel 101 minor axis 112. The minor axis is defined elsewhere in this disclosure.

The third slit 143 is a slit that is formed through the congruent ends of the disk structure of the anchor panel 102. The third slit 143 is positioned in the anchor panel 102 such that the third slit 143 runs parallel to the anchor panel 102 minor axis 122. The span of the length of the aperture formed by the third slit 143 is greater than the span of the length between the first slit 141 and the second slit 142 such that the tag panel 101 inserts through the third slit 143 when the tag panel 101 is folded in on itself along the first slit 141 and the second slit 142.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Bind: As used in this disclosure, to bind is a verb that means to tie or secure a first object to a second object by wrapping a third object around the first object and the second object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Domestic Article: As used in this disclosure, a domestic article is an item or object: 1) that is commonly found within a household; or, 2) that is commonly carried or worn by a person. Examples of domestic articles include, but are not limited to, furniture, kitchen appliances, clothing, keys and key fobs, personal data devices, glasses, remote controls, or personal storage items such as purses, briefcases, wallets, or cases.

Exterior: As used in this disclosure, the exterior is used as a relational term that implies that an object is not contained within the boundary of a structure or a space.

Fastener: As used in this disclosure, a fastener is a device that is used to join or affix a first object to a second object. A fastener is often referred to as a fastening device.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Image: As used in this disclosure, an image is an optical representation or reproduction of an indicia or of the appearance of something or someone. See indicia sentiment optical character recognition.

Identify and Identification: As used in this disclosure, the verb to identify refers to the establishment of: a) what an object is; or, b) who a person is. The verb to identify also refers to establishing: c) a relationship between two objects; d) a relationship between two people; or, e) a relationship between an object and a person. The term identification refers both: f) the process of identifying an object or a person; and, g) an official method (generally in the form of documentation issued by an appropriate authority) used to uniquely establish the identity of the person or object.

Indicia: As used in this disclosure, the term indicia refers to a set of markings that identify a sentiment. See sentiment.

Interior: As used in this disclosure, the interior is used as a relational term that implies that an object is contained within the boundary of a structure or a space.

Label: As used in this disclosure, a label is a structure that attaches to an object. The label displays an image of an indicia that is visibly displayed by the object. The indicia of the label provides a sentiment about the object to which the label attaches. The term tag is a synonym for a label.

Lateral Disk Structure: As used in this disclosure, a lateral disk structure refers to the juxtaposition of a first lateral face of a first disk-shaped structure to a second lateral face of a second disk-shaped structure such that: a) the center axes of the first disk and the second disk are parallel; and, b) the congruent ends of the first disk are parallel to the congruent ends of the second disk. The span of the length of the center axes of the first disk and the second disk need not be equal. The form factor of the congruent ends of the first disk and the second disk need not be geometrically similar.

Lateral Prism Structure: As used in this disclosure, a lateral prism structure refers to the juxtaposition of a first lateral face of a first prism structure to a second lateral face of a second prism structure such that: a) the center axes of the first prism and the second prism are parallel; and, b) the congruent ends of the first prism are parallel to the congruent ends of the second prism. The span of the length of the center axes of the first prism and the second prism need not be equal. The form factor of the congruent ends of the first prism and the second prism need not be geometrically similar.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Luggage: As used in this disclosure, luggage is a trunk, bag, purse, parcel, suitcase, or backpack in which domestic articles are contained during travel.

Major and Minor Axes: As used in this disclosure, the major and minor axes refer to a pair of perpendicular axes that are defined within a structure. The length of the major axis is always greater than or equal to the length of the minor axis.

The major and minor axes intersect at the center of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Present: As used in this disclosure, to present means to bring an object, image, or concept to the attention of an individual.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Raw Edge: As used in this disclosure, a raw edge refers to one of two edges that are formed when a slit is formed in an object. The one or more ends of the slit are called the termination points.

Sentiment: As used in this disclosure, a sentiment refers to a symbolic meaning or message that is communicated through the use of an object or an image, potentially including a text based image.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Slit: As used in this disclosure, a slit is a long narrow cut or opening that is formed in or through an object.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Tape: As used in this disclosure, tape refers to a flexible and narrow strip of textile or sheeting that fastens, secures, or strengthens an object.

Textile: As used in this disclosure, a textile is a material that is woven, knitted, braided, or felted. Synonyms in common usage for this definition include fabric and cloth. The two surfaces of the textile with the greatest surface area are called the faces of the textile.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A luggage tag comprising a tag panel, an anchor panel, and a luggage item;

wherein the tag panel attaches to the anchor panel to form a lateral member;

wherein the lateral member formed by the tag panel and the anchor panel attaches to the luggage item;

wherein the lateral member displays a tag panel image that: a) uniquely identifies the luggage item; and, b) associates the luggage item with its owner;

wherein the tag panel comprises a tag panel major axis, a tag panel minor axis, the tag panel image, a first slit and a second slit;

wherein the tag panel image is displayed from the tag panel;

wherein the first slit and the second slit are formed through the tag panel;

wherein the tag panel major axis and the tag panel minor axis are structures formed by the form factor of the tag panel;

wherein the first slit and the second slit form guides that facilitate the folding of the edges of the perimeter of the tag panel onto the congruent ends of a lateral member of the tag panel;

wherein the span of the length of the aperture formed by the third slit is greater than the span of the length between the first slit and the second slit such that the tag panel inserts through the third slit when the tag panel is folded in on itself along the first slit and the second slit.

2. The luggage tag according to claim 1 wherein the luggage tag is an identification device.

3. The luggage tag according to claim 2 wherein the luggage item further comprises an anchor point;

wherein the lateral member formed by the tag panel and the anchor panel attaches to the anchor point.

4. The luggage tag according to claim 3 wherein the lateral member is a flexible structure.

5. The luggage tag according to claim 4 wherein the tag panel is a sheeting; wherein the tag panel is a flexible structure; wherein the tag panel is formed with a rectangular shape; wherein the tag panel physically attaches to the anchor panel to form the lateral member.

6. The luggage tag according to claim 5 wherein the anchor panel is a sheeting; wherein the anchor panel is a flexible structure; wherein the anchor panel is formed with a rectangular shape; wherein the anchor panel physically attaches to the tag panel to form the lateral member; wherein the anchor panel loops around the anchor point luggage item; wherein the anchor panel binds the tag panel to the anchor point.

7. The luggage tag according to claim 6 wherein the tag panel image is an image; wherein the tag panel image is displayed from the congruent end of the lateral member of the tag panel with the greatest surface area; wherein the tag panel visibly displays the tag panel image; wherein the tag panel image visually identifies the association between the luggage item and its owner.

8. The luggage tag according to claim 7 wherein the anchor panel further comprises an anchor panel major axis, an anchor panel minor axis, and a third slit; wherein the third slit is formed through the anchor panel; wherein the anchor panel major axis and the anchor panel minor axis are structures formed by the form factor of the anchor panel.

9. The luggage tag according to claim 8 wherein the tag panel major axis is the major axis of the lateral member of the tag panel; wherein the tag panel minor axis is the minor axis of the lateral member of the tag panel; wherein the anchor panel major axis is the major axis of the lateral member of the anchor panel; wherein the anchor panel minor axis is the minor axis of the lateral member of the anchor panel; wherein the anchor panel attaches to the tag panel such that the anchor panel major axis aligns with the tag panel major axis such that the anchor panel major axis and the tag panel major axis form a single straight line; wherein the span of the length of the anchor panel minor axis is less than the span of the length of the tag panel minor axis.

10. The luggage tag according to claim 9 wherein the first slit is a slit that is formed through the congruent ends of the lateral member of the tag panel; wherein the first slit is positioned in the tag panel such that the first slit runs parallel to the tag panel major axis; wherein the second slit is a slit that is formed through the congruent ends of the lateral member of the tag panel; wherein the second slit is positioned in the tag panel such that the second slit runs parallel to the tag panel major axis.

11. The luggage tag according to claim 10 wherein the third slit is a slit that is formed through the congruent ends of the lateral member of the anchor panel; wherein the third slit is positioned in the anchor panel such that the third slit runs parallel to the anchor panel minor axis.

* * * * *